(12) United States Patent
Furukawa et al.

(10) Patent No.: US 7,023,914 B2
(45) Date of Patent: Apr. 4, 2006

(54) VIDEO ENCODING APPARATUS AND METHOD

(75) Inventors: Rieko Furukawa, Yokohama (JP); Yoshihiro Kikuchi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 492 days.

(21) Appl. No.: 09/769,309

(22) Filed: Jan. 26, 2001

(65) Prior Publication Data

US 2001/0017887 A1    Aug. 30, 2001

(30) Foreign Application Priority Data

Feb. 29, 2000    (JP) .............................. 2000-053823

(51) Int. Cl.
*H04N 7/18* (2006.01)
(52) U.S. Cl. ..................... 375/240.02; 375/240.03; 375/240.04
(58) Field of Classification Search ............................... 375/240.02–240.08
See application file for complete search history.

(56) References Cited

U.S. PATENT DOCUMENTS 5,978,029 A * 11/1999 Boice et al. ........... 375/240.14
6,215,820 B1 * 4/2001 Bagni et al. ............... 375/240
6,535,251 B1 * 3/2003 Ribas-Corbera ....... 375/240.03

FOREIGN PATENT DOCUMENTS

| JP | 10-304372 | 11/1998 |
|---|---|---|
| JP | 10-336641 | 12/1998 |
| JP | 11-177989 | 7/1999 |

* cited by examiner

*Primary Examiner*—Andy Rao
(74) *Attorney, Agent, or Firm*—Oblon, Spivak, McClelland, Maier & Neustadt, P.C.

(57) ABSTRACT

A video encoding apparatus comprising a feature amount computation section which divides an input video signal into a plurality of scenes each comprising at least one temporally-continuous frame, and compute a statistical feature amount for each scene, an encoding parameter generator section which generates an encoding parameter for each scene based on the statistical feature amount, a number-of-generated-bits prediction section which predicts the number of bits to be generated when the input video signal is encoded using the encoding parameter, an encoding parameter correcting section which corrects the encoding parameter based on a result of the prediction of the number of generated bits, an encoder section which encodes the input video signal using the corrected encoding parameter.

19 Claims, 9 Drawing Sheets

DETERMINATION SCENE SEPARATION

FEW MOTION VECTORS

FIG. 4A

MOTION VECTORS OF THE SAME
DIRECTION AND MAGNITUDE ARE
DISTRIBUTED ALL OVER SCREEN

FIG. 4B

VECTORS APPEAR ONLY IN
PARTICULAR PORTION OF FRAME

FIG. 4C

VECTORS ARE RADIALLY
DISTRIBUTED WITHIN FRAME

FIG. 4D

MANY MOTION VECTORS RUN IN
DIFFERENT DIRECTIONS WITHIN FRAME

VIDEO ENCODING APPARATUS AND METHOD

CROSS-REFERENCE TO RELATED APPLICATIONS

This application is based upon and claims the benefit of priority from the prior Japanese Patent Application No. 2000-053823, filed Feb. 29, 2000, the entire contents of which are incorporated herein by reference.

BACKGROUND OF THE INVENTION

The present invention relates to a vide encoding apparatus and method for use in a video transmission system or a video data system using the Internet, and in particular, to a video encoding apparatus and method that can use a two-pass encoding method to carry out encoding using encoding parameters depending on the contents of scenes, to provide an easy-to-see decoded video that is coordinated for each scene without the need to increase a data size.

The MPEG method used to compress a video compresses data by subjecting error signals in motion compensation between frames of video data to discrete cosine transform (DCT) and quantizing relevant coefficients.

A conventional video encoding method based on the MPEG method executes a process called "rate control" to transmit compressed video data via a transmission channel for which a transmission rate is defined or to record the data in a storage medium having a limited recording capacity. In this rate control, an encoding parameter such as a frame rate or a quantization step size is set so that an output encoded bit stream has a specified bit rate, and encoding is executed based on this parameter.

Figure 10A:
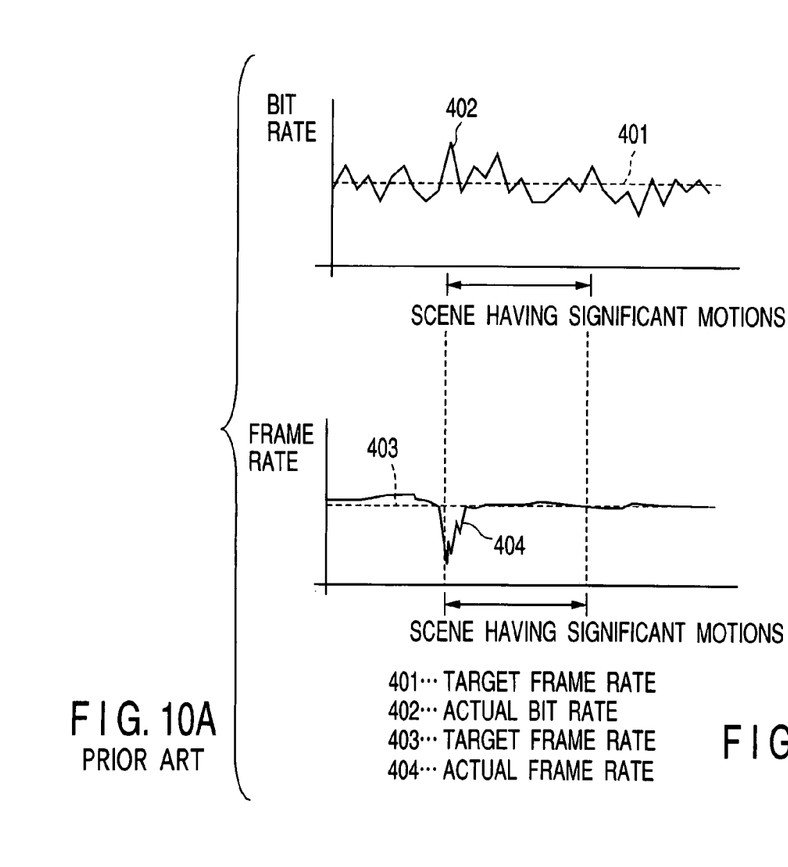
FIGS. 10A and 10B are graphs showing the transitions of a bit rate and a frame bit according to this embodiment, compared to a conventional example.

Many rate control methods determine an interval between the current frame and the next frame and the quantization step size of the next frame depending on the number of generated bits for the preceding frame. Thus, the number of generated bits increases for scenes having significant motions within a screen, thereby rapidly degrading video quality. FIG. 10A shows a conventional rate control. It sets a fixed target bit rate as shown at 401 and a fixed frame rate as shown at 403. In addition, an actual bit rate is shown at 402, and an actual frame rate is shown at 404.

Figure 11:
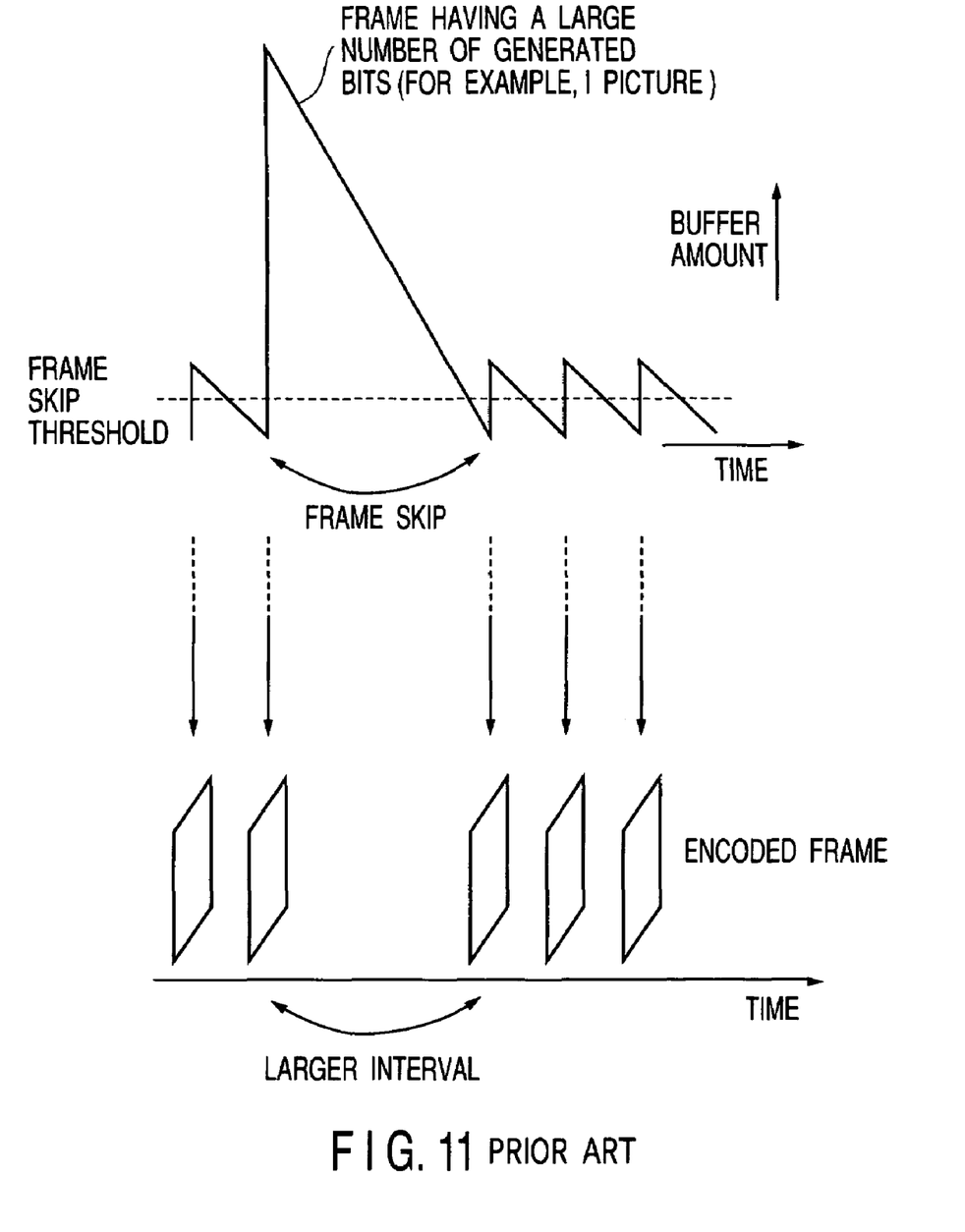
FIG. 11 is a view showing the relationship between a buffer and the frame rate according to a conventional method.

In the conventional rate control, the frame rate is determined based on a difference (available capacity) between a buffer size for a preset frame skip threshold and the current buffer level. When the current buffer size is smaller than the threshold, encoding is carried out with the fixed frame rate. When the current buffer size exceeds the threshold, the frame rate is reduced. Thus, when the scene switches to one having significant motions, the number of generated bits increases rapidly to cause a frame skip as shown in FIG. 11 to reduce the frame rate as shown at 404.

Thus, in the conventional rate control, the number of generated bits is specified regardless of the contents of the video. Consequently, in scenes having significant motions within the screen, the frame interval increases excessively to make the motions unnatural or an inappropriate quantization step size contributes to distorting the video, resulting in a failure to provide viewers an easy-to-see video.

On the other hand, a known rate control system uses a method called "two-pass encoding". Many approaches, however, focus only on variations in the number of generated bits, and only special methods such as shade-in shade-out (Jpn. Pat. Appln. KOKAI Publication No. 10-336641) take the relationship between the contents of the video and the number of generated bits into consideration.

As described above, in the conventional video encoding apparatus, since the frame rate and the quantization step size are determined regardless of the contents of videos, the video quality may be significantly degraded; for example, the frame rate may decrease rapidly in scenes where objects move significantly or an inappropriate quantization step size may contribute distorting the video.

BRIEF SUMMARY OF THE INVENTION

It is an object of the present invention to provide a video encoding apparatus and method that can execute efficient bit allocation suitable for the contents of a video to be encoded, in order to generate visually-coordinated easy-to-see videos.

According to the present invention, there is provided a video encoding apparatus comprising a feature amount computation section configured to divide an input video signal into a plurality of scenes each comprising at least one temporally-continuous frame, and compute a statistical feature amount for each scene, an encoding parameter generator section configured to generate an encoding parameter for each scene based on the statistical feature amount computed by the feature amount computation section, a number-of-generated-bits prediction section configured to predict the number of bits to be generated when the input video signal is encoded using the encoding parameter generated by the encoding parameter generator section, an encoding parameter correcting section configured to correct the encoding parameter based on a result of the prediction of the number of generated bits which is obtained by the number-of-generated-bits prediction section, and an encoder section configured to encode the input video signal using the corrected encoding parameter and generate an encoded bit stream.

According to the invention, there is provided a video encoding method comprising dividing an input video signal into a plurality of scenes each comprising at least one temporally-continuous frame, computing a statistical feature amount for each scene, generating an encoding parameter for each scene based on the statistical feature amount computed by the feature amount computing step, predicting the number of bits to be generated when the input video signal is encoded using the encoding parameter generated by the encoding parameter generating step, correcting the encoding parameter based on a result of the prediction of the number of generated bits which is obtained by the number-of-generated-bits predicting step, and encoding the input video signal using the corrected encoding parameter to generate an encoded bit stream.

According to the present invention, an input video signal is first divided into a plurality of scenes each comprising at least one frame, and a statistical feature amount is calculated for each scene so that the contents of the scene can be estimated based on the statistical feature amount. Further, if the buffer is allowed to have a certain amount of excess capacity for a target bit rate, an encoding bit rate is allocated so as not to exceed an upper or a lower limit set by a user depending on the contents of the scene, and an efficient encoding parameter is determined such that an average bit rate equals a specified value. The present invention is basically characterized in that the encoding parameter is used to encode the input video signal to obtain an easy-to-see decoded video despite the same data size.

The statistical feature amount is calculated by, for example, totalizing, for each scene, motion vectors or luminances present in each frame of the input video signal. In addition, results obtained by estimating from the feature amount, movements of a camera that was used to obtain the input video signal and motions of objects in the video are used to classify each scene into a plurality of predetermined scene types so that the result of the classification can be reflected in assigning a frame rate and a quantization step size. Additionally, the distribution of the luminance is examined for each macroblock as a statistical feature amount to reduce the quantization step size for macroblocks where mosquito noise is likely to occur or object edges are present, compared to the other macroblocks, in order to improve video quality.

In encoding during a second pass according to the present invention, an appropriate bit and frame rates are provided for each calculated scene to achieve rate control for each scene, thereby enabling encoding depending on the contents of the scene without the need to significantly change the conventional rate control mechanism.

The above two-pass method can be used to implement encoding for obtaining an appropriate decoded video with a data size equal to a target number of generated bits.

DETAILED DESCRIPTION OF THE INVENTION

Embodiments of the present invention will be described below with reference to the drawings.

Figure 1:
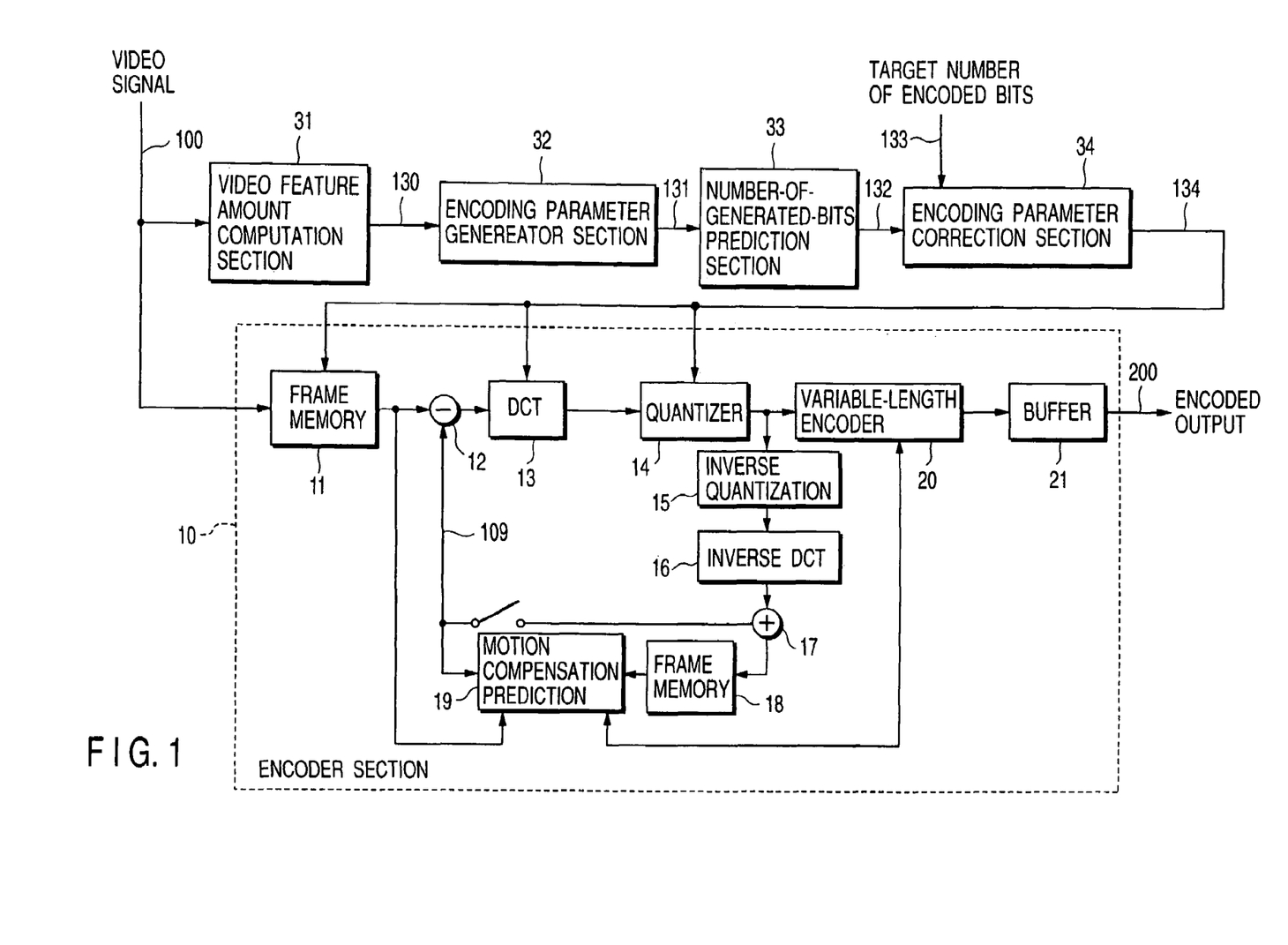
FIG. 1 is a block diagram showing the configuration of a video encoding apparatus according to one embodiment of the present invention.

FIG. 1 is a block diagram showing the configuration of a video encoding apparatus according to one embodiment of the present invention. An input video signal 100 is reproduced by a video recording and reproducing apparatus such as a digital VTR or a DVD system which can repeat reproducing the same signal a number of times and is input to a video feature computation section 31 and a frame memory 11 of an encoder section 10.

It is well known that motion compensation adaptive prediction, discrete cosine transformation, and quantization are used for the MPEG encoding. A two-pass encoding process will be described below.

Figure 2:
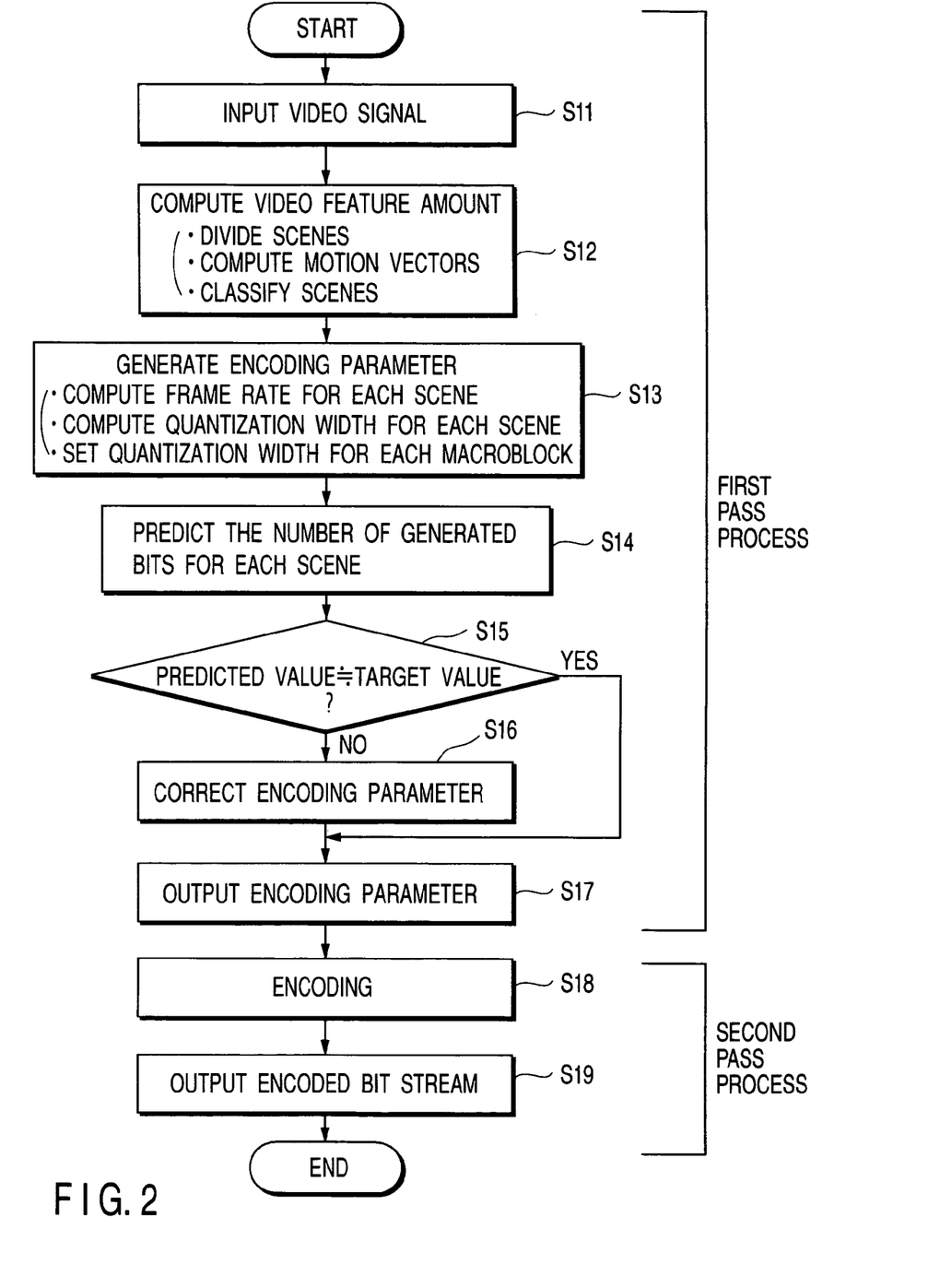
FIG. 2 is a flow chart showing an encoding process procedure according to this embodiment.

In an encoding apparatus shown in FIG. 1, a video signal 100 is input to the video feature computation section 31 before the frame memory 100, an encoding parameter is calculated (first pass), and the calculated encoding parameter 134 and the video signal 100 are input to output an encoded bit stream 200 (second pass). FIG. 2 is a flow chart showing a flow of encoding.

During the first process, the video signal 100 is input to the video feature computation section 31, which then divides the video signal into scenes and computes a video feature amount for each frame (steps S11 and S12). Each scene has at least one temporally-continuous frame.

The video feature amount is, for example, the number of motion vectors, a vector distribution, a vector size, a motion compensation residual error, a luminance/chrominance variance, or the like. The calculated feature amounts are totalized for each scene obtained by the division, and a statistical feature amount is thereby computed for each scene. The video feature computation section 31 transmits a statistical feature amount 130 obtained for each scene to an encoding parameter generator section 32, which generates an appropriate encoding parameter for each scene (step S13). In this case, based on the statistical feature amount 130, movements of a camera that was used to obtain the input video signal and motions of objects in the video are estimated for each scene, and based on results of the estimation, appropriate frame rate and quantization step size are computed for each scene. Additionally, a luminance distribution is examined for each macroblock to set the quantization step size of the macroblock by, for example, reducing the quantization step size of macroblocks where mosquito noise is likely to occur or object edges are present, relative to the other macroblocks, in order to improve video quality.

The encoding parameter 131 obtained from the encoding parameter generator section 32 is input to a number-of-generated-bits prediction section 33. The number-of-generated-bits prediction section 33 computes the number of bits generated when encoding is executed using the frame rate and quantization step size computed as the encoding parameters, to predict the number of bits generated when the video signal 100 is encoded (step S14). A prediction value 132 is transmitted to an encoding parameter correcting section 34.

If the predicted number of generated bits substantially differs from a target number of encoded bits 133 set by a user, the encoding parameter correcting section 34 corrects the parameters so that the predicted number of generated bits equals the user set value (steps S15 and S16). In this manner, a bit frame and a frame rate 134 for each scene which are used for a second pass (step S17).

During the second pass, the encoder section uses the frame rate and bit rate 134 computed for each scene to encode the input video signal (step S18), and outputs a bit stream 200 with the number of generated bits appropriately allocated depending on the contents of the scene (step S19).

The encoding process executed by the encoder section will be simply explained.

The input video signal 100 input to the frame memory 11 is divided into macroblocks, which are then input to a subtractor 12. The subtractor 12 computes a difference between the input video signal and a predicted video signal to generate a predictive residual signal. A DCT (Discrete Cosine Transformation) section 13 subjects the predictive error signal to discrete cosine transformation. A quantizer section 14 quantizes DCT coefficient data obtained from the DCT section 13. The quantized signal is branched into two; one of them is variable-length encoded by a variable-length encoder section 20 together with motion vector and has its transmission rate smoothed by a buffer 21 before being output as encoded data (a bit stream). The buffer 21 is used as a virtual one that changes the bit rate for each scene to a specified value in accordance with the bit rate information 134 so that a quantization step size and an interval between frames to be encoded can be controlled based on a virtual buffer occupancy.

On the other hand, the other portion of the branched signal is sequentially subjected by a dequantizer section 15 and an inverse DCT (Discrete Cosine Transformation) section 16 to processes inverse to the processes executed by the quantizer section 14 and the DCT section 13, and is then added to a predictive video signal by an adder 17. Thus, a local decoded signal is generated. This signal is stored in a frame memory 18 and input to a motion prediction section 19. The motion prediction section 19 executes motion compensation processes such as motion detection and retrieval of motion vectors based on the correlationship between the input video signal and the video in the preceding frame stored in the frame memory 18, thereby generating a predictive image signal.

<Video Feature Computation Section, Divide Scenes>

The input video signal 100 is divided into a plurality of scenes after removing whitened and noise frames therefrom based on differences between adjacent frames. The whitened frame has a rapidly increasing luminance as occurring in, for example, an interview scene during a news program when a flash (a strobe) emits light. In addition, the noise frame has a significantly degraded video due to deflection of the camera or the like.

Figure 3A:
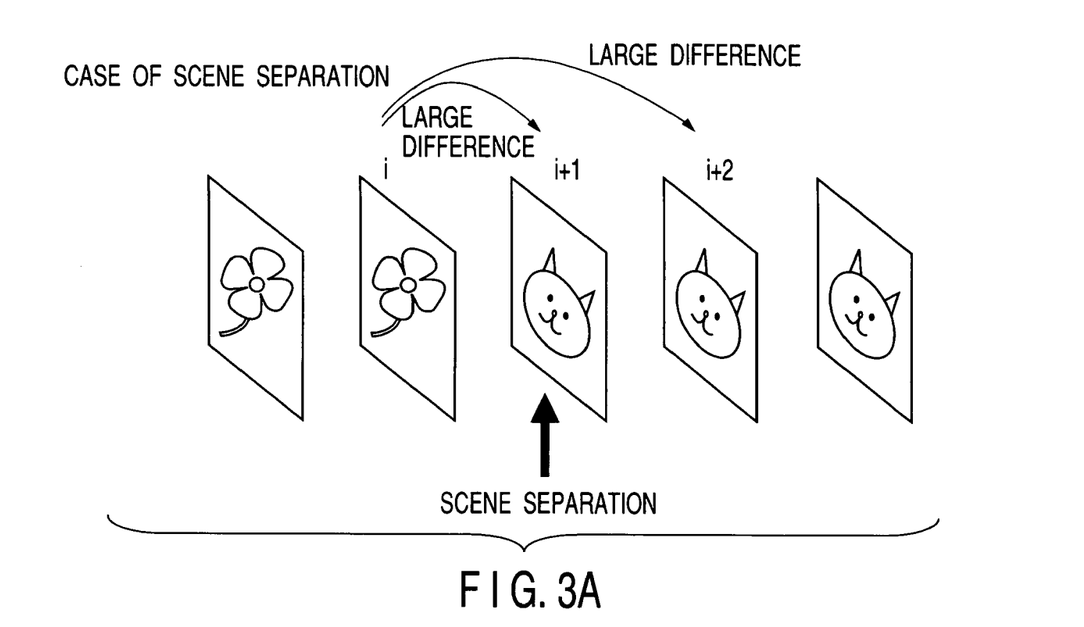
FIGS. 3A and 3B are views showing a scene dividing process procedure according to this embodiment.
Figure 3B:
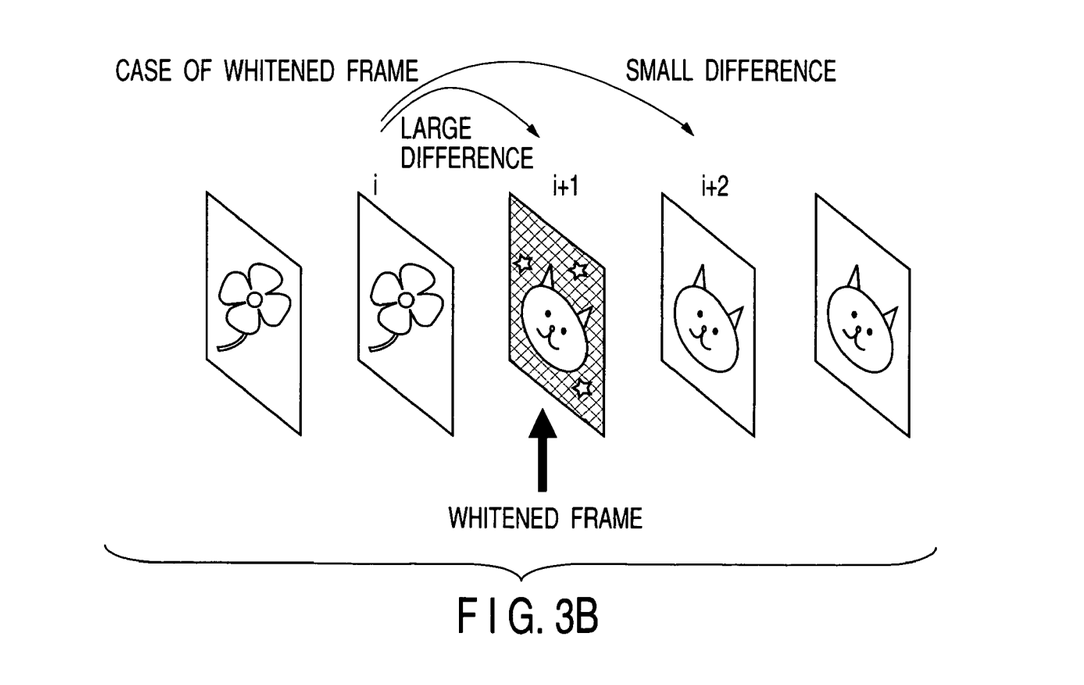

The scene division is carried out, for example, in the following manner: If a difference between an i-th frame and an adjacent (i+1)-th frame exceeds a predetermined threshold and a difference between the I-th frame and an (i+2)-th frame also exceeds the threshold as shown in FIG. 3A, it is determined that the (i+1)-th frame is located to separate different scenes. On the other hand, if the difference between the i-th frame and the (i+1)-th frame exceeds a predetermined threshold but the difference between the i-th frame and the (i+2)-th frame does not exceed the threshold as shown in FIG. 3B, it is determined that the (i+1)-th frame is not located to separate different scenes.

<Video Feature Computation Section, Compute Motion Vectors>

In addition to the scene division, motion vectors of macroblocks within a frame, a motion compensation residual error, average and variance of luminance, and others are computed for all frames of the input video signal 100. The feature amount may be computed for all the frames or every several frames as long as the nature of the video can be analyzed.

The number of macroblocks in a dynamic area, the motion computation residual error, and the luminance variance for i-th frame are denoted by MvNum (i), MeSad (i), and Yvar (i). The dynamic area refers to a macroblock area in one frame where the motion vector ≠0 relative to the preceding frame. The average values of MvNum (i), MeSad (i), and Yvar (i) of all the frames contained in a j-th scene are denoted by MVnum_j, MeSad_j, and Yvar_j, which are representative values of the feature amount of the j-th scene.

<Video Feature Computation Section, Classify Scenes>

Further, in this embodiment, motion vectors are used to classify scenes as described below to estimate the contents thereof.

After motion vectors have been computed for each frame, a motion vector distribution is examined to classify the scenes. Specifically, the distribution of motion vectors within the frame is first computed to examine which of the five types shown in FIGS. 4A to 4E each frame belongs.

Figure 4A:
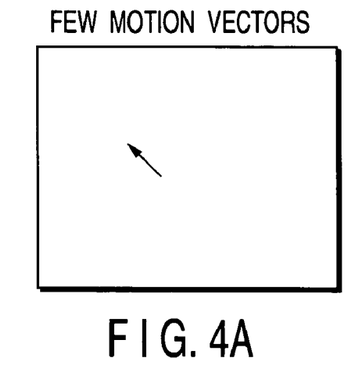
FIGS. 4A to 4E are views useful in explaining how frames are classified into different types using motion vectors according to this embodiment.

FIG. 4A: almost no vector is present in the frame (the number of macroblocks in a dynamic area is equal to or smaller than Mmin).

Figure 4B:
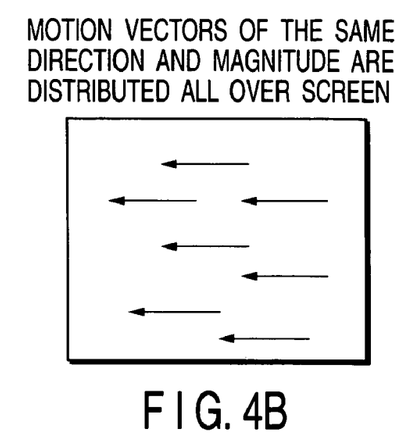

FIG. 4B: motion vectors of the same direction and size are distributed all over the screen (the number of macroblocks in the dynamic area is equal to or larger than Mmax and the size and the direction fall within certain ranges).

Figure 4C:
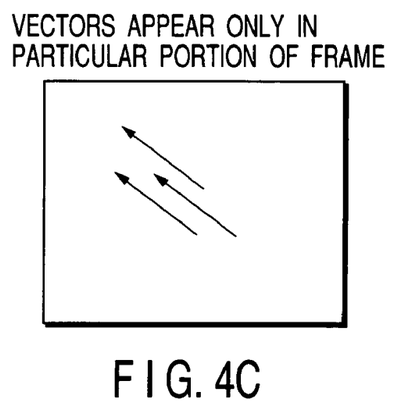

FIG. 4C: motion vectors appear only in a particular portion of the frame (the positions of the macroblocks in the dynamic area concentrate in a particular portion).

Figure 4D:
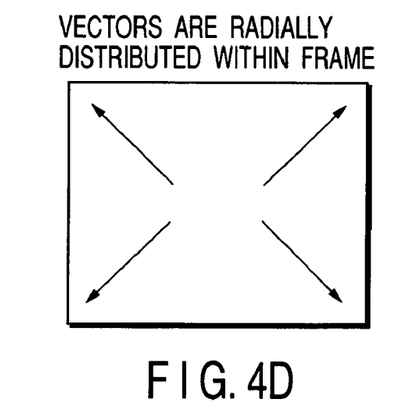

FIG. 4D: motion vectors are radially distributed in the frame.

Figure 4E:
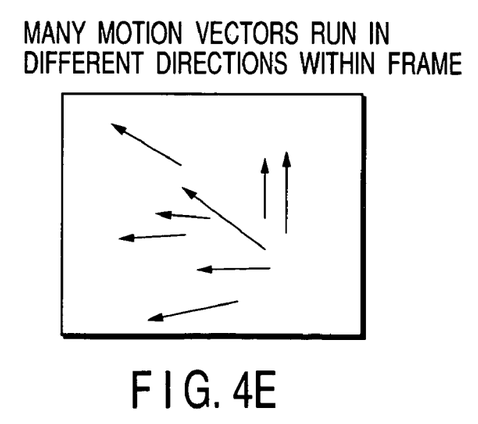

FIG. 4E: there are a large number of motion vectors extending in different directions in the frame.

The cases shown in FIGS. 4A to 4E are closely related to a camera that was used to obtain the input video signal or to motions of objects in the captured video. That is, in FIG. 4A, the camera and the objects are stationary. In FIG. 4B, the camera is moving in parallel. In FIG. 4C, the objects are moving against a stationary background. In FIG. 4D, the camera is zooming. In FIG. 4E, both the camera and the objects are moving.

As described above, results obtained by classifying the frames are arranged for each scene, and it is determined which of the types shown in FIGS. 4A to 4E the scene belongs. The determined type of the scene and the calculated feature amount are used to determine for each scene a frame rate and a bit rate, which are encoding parameters.

Next, the processes executed by the encoding parameter generator section 32 will be individually described in detail.

<Encoding Parameter Generator Section, Computation of Frame Rates>

The encoding parameter generator section 32 first computes a frame rate.

The above described feature amount computation section 32 is assumed to have computed a representative value of a feature amount for each scene. Then, the frame rate FR (j) of the j-th scene is computed by:

$$FR(j)=a*MVnum\_j+b+W\_FR \qquad (1)$$

where MVnum_j denotes a representative value for the j-th scene, a and b denote coefficients for a bit rate and a video size specified by a user, and W_FR denotes a weight parameter described later. Equation 1 means that the frame rate FR (j) increases consistently with representative value MVnum_j of motion vector. That is, the more significant motions in the scene are, the higher the frame rate is.

Additionally, the representative value MVnum_j of motion vector may be the sum of the absolute values of the magnitudes of the motion vectors in the frame or the density of the motion vectors, instead of the above described number of motion vectors in the frame.

<Encoding Parameter Generator Section, Compute Quantization Width>

After the frame rate has been computed for each scene, the quantization step size is computed for each scene.

Similarly to the frame rate FR (j), the quantization step size QP (j) for the j-th scene is computed by means of the following equation using the representative value MVnum_j of motion vector:

$$QP(j)=c \cdot MVnum\_J+d+W\_QP \quad (2)$$

where c and d denote coefficients for a bit rate and a video size specified by a user, and W_QP denotes a weight parameter described later. Equation 2 means that the quantization step size QP (j) increases consistently with the representative value Mvnum_j of motion vector. That is, the more the significant motions in the scene are, the larger the quantization step size is, whereas the less significant motions in the scene are, the smaller the quantization step size is and the clearer the video is.

<Encoding Parameter Generator Section, Correct Frame Rate and Quantization Step Size>

In determining the frame rate and the quantization step size using Equations (1) and (2), the results of the classification of the scenes obtained from the process in <Feature Amount Computation Section, Scene Classification>are used to add the weight parameter W_FR to Equation (1) while adding the weight parameter W_QP to Equation (2) in order to correct the frame rate and the quantization step size.

In the case of FIG. 4A where almost no motion vector is present in the frame, the frame rate is reduced to diminish the quantization step size (both W_FR and W_QP are reduced). In FIG. 4B, the frame rate is maximized while the quantization step size is increased (both W_FR and W_QP are increased) in such a manner that movements of the camera are natural. In FIG. 4C, if the motions of the objects are significant, that is, the magnitude of the motion vectors is high, the frame rate is corrected (W_FR is increased). In FIG. 4D, since almost no attention is paid to the objects during zooming, the quantization step size is increased while the frame rate is maximized (W_FR is increased, while W_QR is increased). In FIG. 4E, the frame rate and the quantization step size are increased (both W_FR and W_QP are increased).

The weight parameters W_FR and W_QP are added to the equations to adjust the frame rate and the quantization step size.

<Encoding Parameter Generator Section, Set Quantization Width for Each Macroblock>

If the user specifies that the quantization step size is varied for each macroblock, the video quality can be improved by setting the quantization step size for macroblocks where mosquito noise is likely to occur in the frame or strong edges are present as in telop characters, smaller than that for the other macroblocks.

Figure 5:
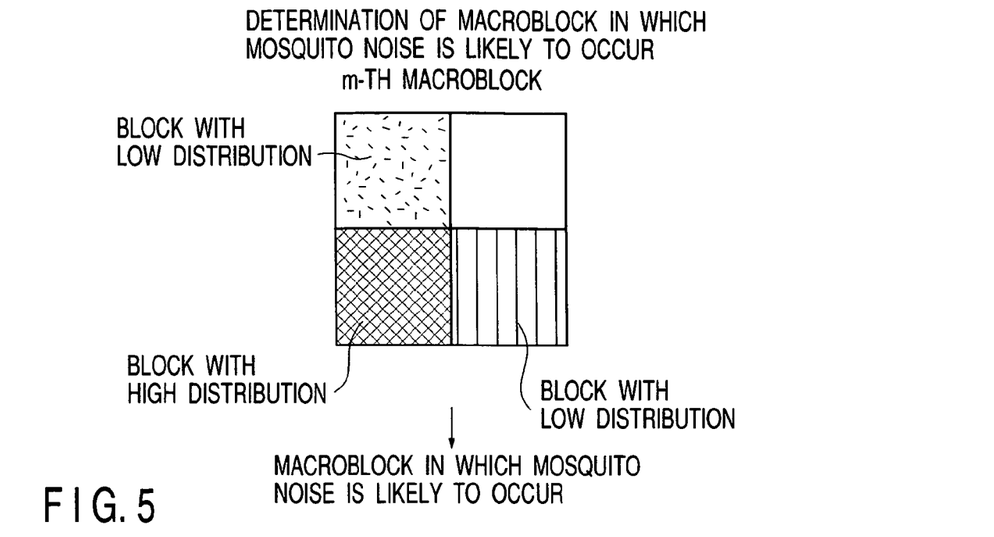
FIG. 5 is a view useful in explaining determination of macroblocks where mosquito noise is likely to occur according to this embodiment.

For the frame to be encoded, the macroblock is further divided into four subblocks as shown in FIG. 5, to compute the variance of the luminance for each subblock. If a subblock with a large variance is adjacent to a subblock with a small variance and when the quantization step size is large, mosquito noise is likely to occur in that macroblock. That is, mosquito noise is likely to occur if a portion of the macroblock which has a complicated texture is adjacent to a portion having a flat texture.

Each macroblock is examined to determine whether a subblock with a large luminance variance is adjacent to a subblock with a small variance so that the quantization step size for microblocks for which mosquito noise is determined to be likely to occur is set smaller than that for the other microblocks. On the contrary, the quantization step size for macroblocks which have a flat texture and for which mosquito noise is determined to be unlikely to occur is set larger than that for the other macroblocks to prevent an increase in the number of generated bits.

For example, when an m-th macroblock in the j-th frame has four small blocks therein, if any of the small blocks meet a combination of:

(variance of block $k$)$\geq MBVarThre1$ and (variance of block adjacent to block $k$)$<MBVar$-$Thre2$ \quad (3), this m-th macroblock is determined to be one where mosquito noise is likely to occur (MBVarThre1 and MBVarThre2 denote thresholds defined by the user). The quantization step size QP (j)_m for the m-th macroblock is reduced as shown in:

$$QP(j)\_m=QP(j)-q1 \quad (4)$$

On the other hand, for an m'-th macroblock determined to be one where mosquito noise is unlikely to occur, the quantization step size QP (j)_m is increased as shown in the following equation to prevent an increase in the number of generated bits:

$$QP(j)\_m'=QP(j)-q2 \quad (5)$$

(q1 and q2 denote positive numbers that meet QP (j)−q1≧ (minimum value of quantization step size) and QP (j)+q2≧ (maximum value of quantization step size)).

In this case, for scenes determined during the above described camera parameter determination to contain parallel movements as shown in FIG. 4B or camera zooming as shown in FIG. 4D, the q1 and q2 are reduced because the objects in the video gather low visual attention due to the domination of camera movements. On the contrary, for still scenes such as that shown in FIG. 4A or scenes containing concentrated movements as shown in FIG. 4C, the q1 and q2 are increased because the objects in the video gather high visual attention.

Additionally, for macroblocks containing edges as in characters, the character portions can be made clearer by reducing the quantization step size. The frame luminance data are subjected to an edge emphasis filter, and each macroblock is checked for pixels of a high contrast gradient. The positions of the pixels are totalized to determine blocks having pixels of a high gradient partially concentrated therein, to be macroblocks. The quantization step size is then reduced for those blocks in accordance with Equation (4) and is increased for the other blocks in accordance with Equation (5).

Next, the processes executed by the encoding parameter correcting section 34 to correct the encoding parameters computed as described above so as to achieve a user specified bit rate will be individually explained.

<Encoding Parameter Correcting Section, Predict the Number of Generated Bits>

When the frame rate and quantization rate computed for each scene as described above are used to execute encoding, the bit rate of the scene may exceed its upper or lower limit value. Thus, the parameter for a scene which exceeds the limit value must be adjusted to decrease below the upper limit value or increase above the lower limit value.

Figure 6A:
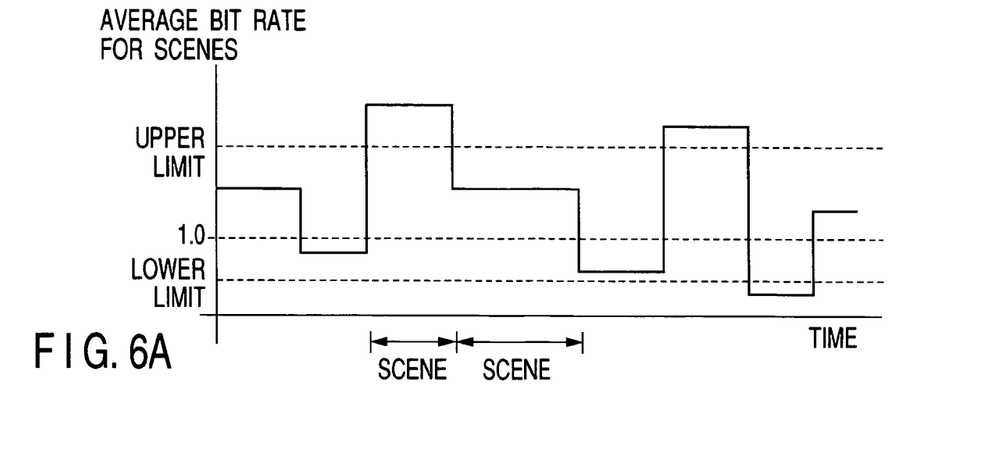
FIGS. 6A to 6C are views showing the procedure of a process for adjusting the number of generated bits according to this embodiment.

For example, when the computed encoding parameters, that is, the frame rate and quantization rate are used to execute encoding and the ratio of the bit rate for each scene to the user set bit rate is then computed, some scenes may have a bit rate exceeding its upper or lower limit value, as shown in FIG. 6A. Thus, the present invention executes a correction process such that the bit rate for the scene does not exceed its allowable upper or lower limit value.

Figure 6B:
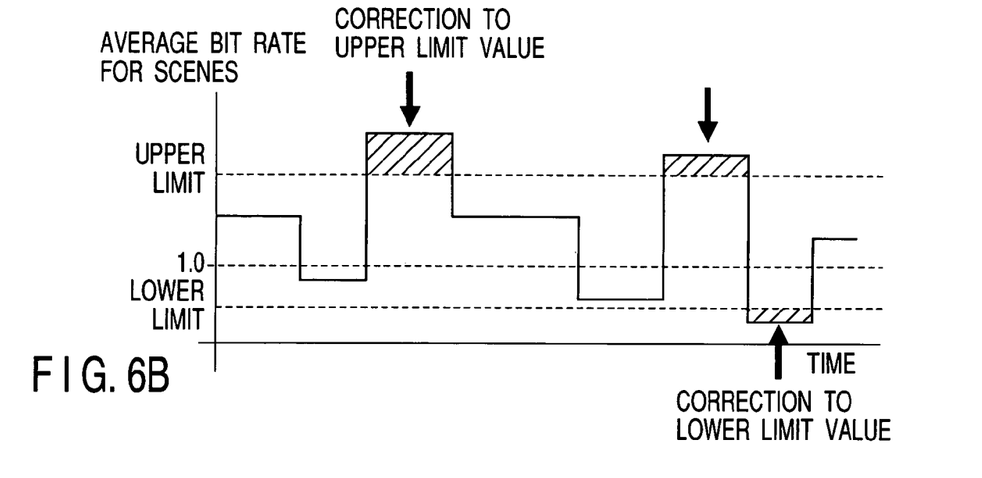
Figure 6C:
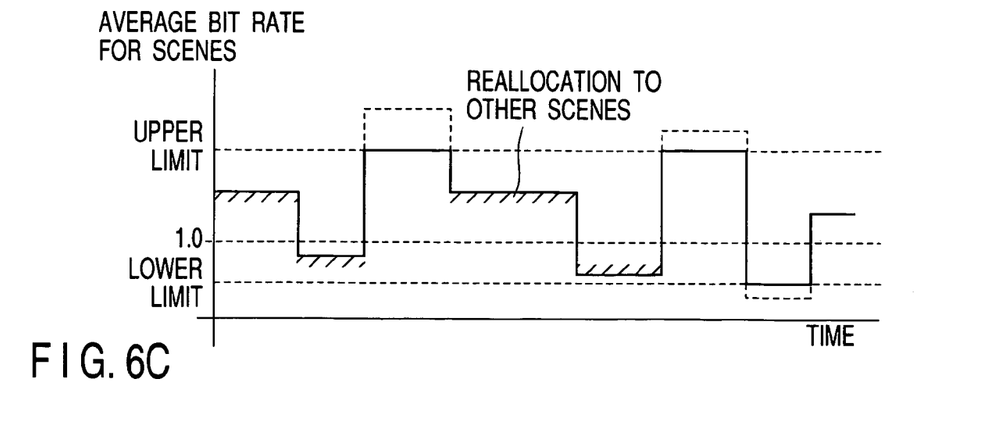

When the ratio of the bit rate for each scene to the bit rate specified by the user is computed, for scenes having a bit rate exceeding its upper limit value, the bit rate is reset to its upper limit value as shown in FIG. 6B. An excess or insufficient number of generated bits resulting from this operation are reallocated to the other scenes that have not been corrected, as shown in FIG. 6C, in such a manner that the total number of generated bits remains unchanged.

Figure 7:
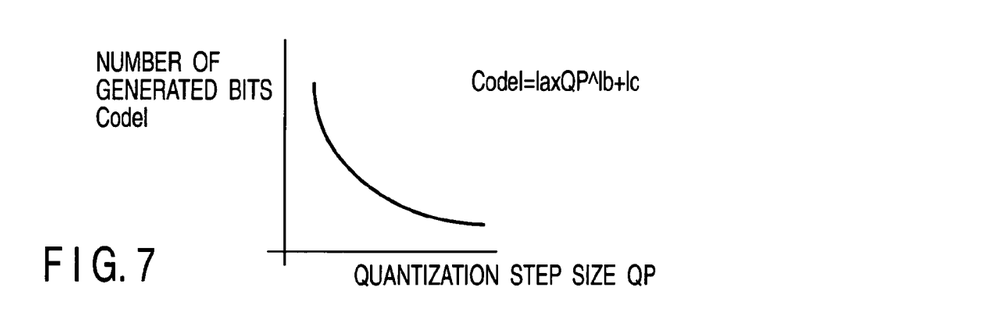
FIG. 7 is a view showing the number of generated bits for an I picture according to this embodiment.

The number of generated bits is predicted, for example, in the following manner:

The first frame of each scene is assumed to be an I picture, while the other frames are assumed to be P pictures, and the number of generated bits is computed for each picture. For the number of generated bits for the I picture, a relation such as that shown in FIG. 7 generally exists between the quantization step size QP and the number of encoded bits, so that the number of bits generated per frame CodeI is computed, for example, in the following manner:

$$CodeI = Ia * QP^{Ib} + Ic \quad (6)$$

where ^ denotes a power and Ia, Ib, and Ic denote coefficients determined by a video size or the like.

Figure 8:
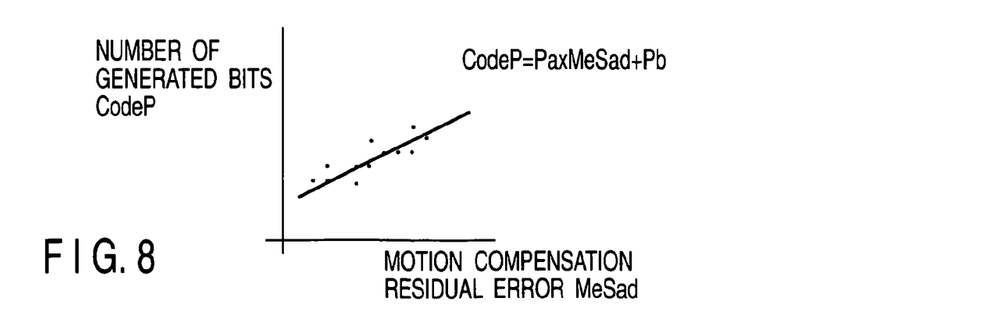
FIG. 8 is a view showing the number of generated bits for P pictures according to this embodiment.

Further, for the P pictures, a relation such as that shown in FIG. 8 generally exists between the motion compensation residual MeSad and the number of encoded bits, so that the number of bits generated per frame CodeP is computed, for example, in the following manner:

$$CodeP = Pa * MeSad + Pb \quad (7)$$

where Pa and Pb denote coefficients determined by the video size, the quantization step size QP, or the like. The video feature amount computation section is assumed to have computed the MeSad, which is used for Equation (7), and the ratio of the number of bits generated for each scene is computed using these equations. The number of bits generated for the j-th scene is:

$$Code\ (j) = CodeI + (\text{sum of } CodePs \text{ for the frame to be encoded}) \quad (8)$$

The number of encoded bits Code (j) computed using the above equation is divided by the length T (j) of that scene to obtain an average bit rate BR (j) for the scene.

$$BR(j) = Code(j)/T(j) \quad (9)$$

The encoding parameters are corrected based on the computed bit rate.

In addition, if the number of encoded bits predicted through the above correction of the bit rate is to be substantially changed, the frame rate for each scene need not be corrected. That is, the video quality is maintained by reducing the frame rate for a scene having a reduced bit rate while increasing the frame rate for a scene having an increased bit rate. As described above, the frame rate and bit rate computed for each scene during the first pass are passed to the encoder section to encode the video signal 100. The encoder section 10 executes encoding using the conventional rate control while switching between the target bit rate and the frame rate for each scene based on the encoding parameter 134 obtained during the first pass. In addition, the macroblock information obtained during the first pass is used to vary the macroblock quantization step size relative to the quantization step size computed through the rate control.

Thus, the bit rate is maintained within one complete scene to enable the size of an encoded bit stream to meet the target data size.

Figure 10B:
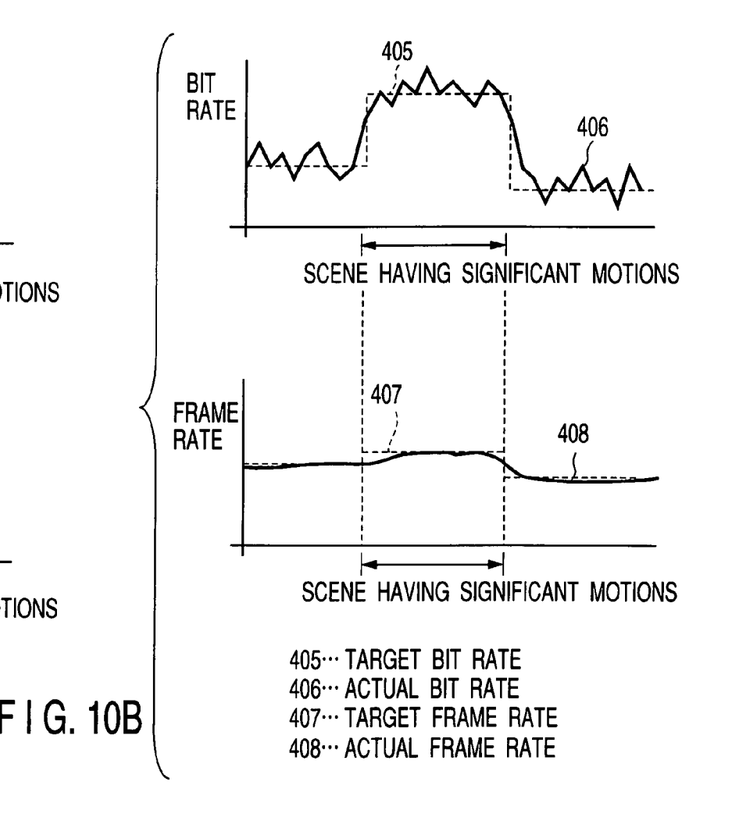

FIGS. 10A and 10B show examples of transitions of the bit and frame rates observed when the conventional and present methods are used for encoding. The conventional method (FIG. 10A) sets a fixed bit rate as shown at 401 and a fixed frame rate as shown at 403. Additionally, an actual bit rate is shown at 402 and an actual frame rate is shown at 404. Then, when the scene switches to one having significant motions, the number of generated bits increases rapidly to cause a frame skip as shown in FIG. 11 to reduce the frame rate as shown at 404. In contrast, the present method (FIG. 10B) sets a target bit rate as shown at 405 and a target frame rate as shown at 407, depending on the scene. Thus, even when the scene switches to one having significant motions, that scene has a high bit rate assigned thereto to hinder the frame skip, thereby allowing the frame rate to meet the target value.

Figure 9:
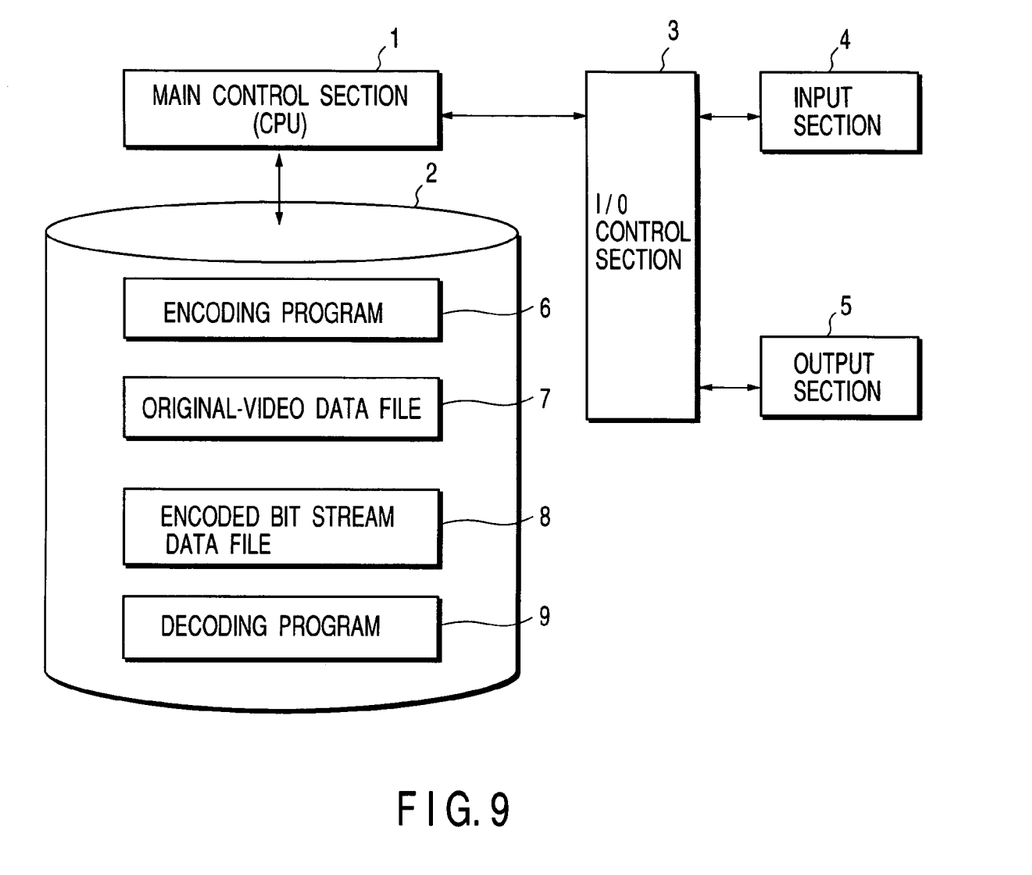
FIG. 9 is a view showing the functional configuration of a computer where an encoding process is executed using software according to this embodiment.

All the functions of the encoding apparatus according to this embodiment can be implemented using computer programs; effects similar to those of this embodiment can be obtained by introducing these computer programs into a normal computer through a computer-readable recording medium. The functional configuration of such a computer is shown in FIG. 9.

A main control section 1 comprises a CPU or the like for executing various programs. A storage section 2 has an encoding program 6 loaded therein so that the encoding program 6 can be executed to obtain a statistical feature amount for each scene of an original video data file 7 to be encoded so as to carry out encoding optimized for each scene based on the statistical feature amount. The video signal to be encoded needs not be loaded in the storage section 2 as the original video data file 7 beforehand, but video signals input from an external digital VTR or DVD through an I/O control section 3 and an input section 4 may be repeatedly input for two-pass-encoding. Results of the encoding by the encoding program 6 are output as an encoded bit stream data file 8, which can be transmitted through an output section 5 or can be decoded or reproduced using a decoding program 9.

As described above, according to the present invention, for scenes having significant motions, the bit rate is set relatively high to restrain the frame skip to smooth the motions of the objects, whereas for still scenes, the quantization step size is set small for edges or peripheries of characters which gather much attention, resulting in a clear video. Thus, compared to conventional encoded videos for which the motions of the objects therein are ignored, videos integrated for each scene are obtained to improve the video quality.

Additionally, the bit rate is efficiently allocated for each scene so as not to exceed its upper or lower limit value. Furthermore, since the conventional rate control is used for the encoding, a video encoding apparatus that can meet the target data size can be configured with few changes to the encoding mechanism.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoding apparatus comprising:
a feature amount computation unit configured to divide an input video signal into a plurality of scenes each comprising at least one temporally-continuous frame, and compute a statistical feature amount for each scene;
an encoding parameter generator to generate an encoding parameter for each scene based on the statistical feature amount computed by the feature amount computation unit;
a number-of-generated-bits prediction unit configured to predict the number of bits to be generated when the input video signal is encoded using the encoding parameter generated by the encoding parameter generator;
an encoding parameter correcting unit configured to correct the encoding parameter based on a result of the prediction of the number of generated bits which is obtained by the number-of-generated-bits prediction unit;
an encoder to encode the input video signal using the corrected encoding parameter and generate an encoded bit stream; and
an output unit configured to output the encoded bit stream generated by the encoder as an encoded output, wherein the encoding parameter generator includes a setting unit configured to correct a frame rate as well as a quantization step by setting a weighted parameter to the frame rate as well as setting a weighted parameter to the quantization step size for macro blocks of frames to be encoded for each scene on the bases of the statistical feature amount relating to a distribution of luminance for each macro block.

2. A video encoding apparatus comprising:
a feature amount computation unit configured to divide an input video signal into a plurality of scenes each comprising at least one temporally-continuous frame, and compute a statistical feature amount for each scene;
an encoding parameter generator to generate an encoding parameter for each scene based on the statistical feature amount computed by the feature amount computation unit;
a number-of-generated-bits prediction unit configured to predict the number of bits to be generated when the input video signal is encoded using the encoding parameter generated by the encoding parameter generator;
an encoding parameter correcting unit configured to correct the encoding parameter based on a result of the prediction of the number of generated bits which is obtained by the number-of-generated-bits prediction unit;
an encoder to encode the input video signal using the corrected encoding parameter and generate an encoded bit stream; and
an output unit configured to output the encoded bit stream generated by the encoder as an encoded output, wherein the feature amount computation unit includes a classification unit configured to classify the plurality of scenes into a plurality of scene types, based on the statistical feature amount relating to a motion vector, and the encoding parameter generator includes a setting unit configured to correct a frame rate as well as a quantization step by setting weight parameters to the frame rate and the quantization step size, respectively, for each scene according to the scene types.

3. The video encoding apparatus according to claim 2, wherein the setting unit is configured to set the weight parameters to the frame rate and the quantization step size for macro blocks of frames to be encoded for each scene on the bases of the statistical feature amount relating to a distribution of luminance for each macro block.

4. A video encoding method comprising:
dividing an input video signal into a plurality of scenes each comprising at least one temporally-continuous frame;
computing a statistical feature amount for each scene;
generating an encoding parameter for each scene based on the statistical feature amount computed by the feature amount computing step;
predicting the number of bits to be generated when the input video signal is encoded using the encoding parameter generated by the encoding parameter generating step;
correcting the encoding parameter based on a result of the prediction of the number of generated bits which is obtained by the number-of-generated-bits predicting step; and
encoding the input video signal using the corrected encoding parameter to generate an encoded bit stream,
wherein the encoding parameter generating step includes correcting a frame rate as well as a quantization step size by setting weight parameters to the frame rate and the quantization step size, respectively, for macro blocks of frames to be encoded for each scene on the bases of the statistical feature amount relating to a distribution of luminance for each macro block.

5. A video encoding method comprising:
dividing an input video signal into a plurality of scenes each comprising at least one temporally-continuous frame;
computing a statistical feature amount for each scene;
generating an encoding parameter for each scene based on the statistical feature amount computed by the feature amount computing step;
predicting the number of bits to be generated when the input video signal is encoded using the encoding parameter generated by the encoding parameter generating step;
correcting the encoding parameter based on a result of the prediction of the number of generated bits which is obtained by the number-of-generated-bits predicting step; and
encoding the input video signal using the corrected encoding parameter to generate an encoded bit stream,
wherein the feature amount computing step includes classifying the plurality of scenes into a plurality of scene types, based on the statistical feature amount relating to a motion vector, and the encoding parameter generating step includes correcting a frame rate as well as a quantization step size by setting weight parameters to the frame rate and the quantization step size, respectively, for each scene according to the scene types.

6. The method according to claim 5, wherein the encoding parameter generating step includes setting the weight parameters to the frame rate and the quantization step size, respectively, for macro blocks of frames to be encoded for each scene on the bases of the statistical feature amount relating to a distribution of luminance for each macro block.

7. A recording medium having a computer program recorded therein for encoding an input video signal, the computer program comprising:

instruction means for instructing the computer to divide an input video signal into a plurality of scenes each comprising at least one temporally-continuous frame and compute a statistical feature amount for each scene;

instruction means for instructing the computer to generate an encoding parameter for each scene based on the statistical feature amount;

instruction means for instructing the computer to predict the number of bits generated when the input video signal is encoded using the encoding parameter;

instruction means for instructing the computer to correct the encoding parameter based on a result of the prediction of the number of generated bits; and instruction means for instructing the computer to encode the input video signal using the corrected encoding parameter and generate an encoded bit stream, wherein the means for instructing the computer to generate the encoding parameter includes means for instructing the computer to correct a frame rate as well as a quantization step size by setting weight parameters to the frame rate and the quantization step size, respectively, for macro blocks of frames to be encoded for each scene on the bases of the statistical feature amount relating to a distribution of luminance for each macro block.

8. The apparatus according to claim 1, wherein the setting unit includes a computing unit configured to compute the frame rate and the quantization step from a sum of a value determined by a bit rate, a video size and a representative value for each scene and a value determined by a motion vector of an object in the scene.

9. The apparatus according to claim 1, wherein the setting unit includes a computing unit configured to compute the frame rate and the quantization step by a following equation:

$$FR(j)=a*MVnum\_j+b+W\_FR$$

where FR(j) represents the frame rate, MVnum_j denotes a representative value for a j-th scene, a and b denote coefficients for a bit rate and a video size specified by a user, and W_FR denotes a weight parameter, and $$QP(j)=c*MVnum\_j+d+W\_QP$$

where QP(j) represents the frame rate, c and d denote coefficients for a bit rate and a video size specified by a user, and W_QP denotes a weight parameter.

10. The apparatus according to claim 1, wherein the setting unit includes a reset unit configured to reset the bit rate exceeding an upper limit value or a lower limit value.

11. The apparatus according to claim 2, wherein the setting unit includes a computing unit configured to compute the frame rate and the quantization step from a sum of a value determined by a bit rate, a video size and a representative value for each scene and a value determined by a motion vector of an object in the scene.

12. The apparatus according to claim 2, wherein correcting the frame rate as well as the quantization step includes computing the frame rate and the quantization step by an equation as follows:

$$FR(j)=a*MVnum\_j+b+W\_FR$$

where FR(j) represents the frame rate, MVnum_j denotes a representative value for a j-th scene, a and b denote coefficients for a bit rate and a video size specified by a user, and W_FR denotes a weight parameter, and $$QP(j)=c*MVnum\_j+d+W\_QP$$

where QP(j) represents the frame rate, c and d denote coefficients for a bit rate and a video size specified by a user, and W_QP denotes a weight parameter.

13. The method according to claim 2, wherein the setting unit includes a reset unit configured to reset the bit rate exceeding an upper limit value or a lower limit value.

14. The method according to claim 5, wherein correcting the frame rate as well as the quantization step includes computing the frame rate and the quantization step from a sum of a value determined by a bit rate, a video size and a representative value for each scene and a value determined by a motion vector of an object in the scene.

15. The method according to claim 5, wherein correcting the frame rate as well as the quantization step includes computing the frame rate and the quantization step by an equation as follows:

$$FR(j)=a*MVnum\_j+b+W\_FR$$

where FR(j) represents the frame rate, MVnum_j denotes a representative value for a j-th scene, a and b denote coefficients for a bit rate and a video size specified by a user, and W_FR denotes a weight parameter, and $$QP(j)=c*MVnum\_j+d+W\_QP$$

where QP(j) represents the frame rate, c and d denote coefficients for a bit rate and a video size specified by a user, and W_QP denotes a weight parameter.

16. The method according to claim 5, wherein correcting the frame rate as well as the quantization step includes resetting the bit rate exceeding an upper limit value or a lower limit value.

17. The recording medium according to claim 7, wherein the means for instructing the computer to correct the frame rate as well as the quantization step size includes means for instructing the computer to compute the frame rate and the quantization step from a sum of a value determined by a bit rate, a video size and a representative value for each scene and a value determined by a motion vector of an object in the scene.

18. The recording medium according to claim 7, wherein the means for instructing the computer to correct the frame rate as well as the quantization step size includes means for instructing the computer to compute the frame rate and the quantization step by an equation as follows:

$$FR(j)=a*MVnum\_j+b+W\_FR$$

where FR(j) represents the frame rate, MVnum_j denotes a representative value for a j-th scene, a and b denote coefficients for a bit rate and a video size specified by a user, and W_FR denotes a weight parameter, and $$QP(j)=c*MVnum\_j+d+W\_QP$$

where QP(j) represents the frame rate, c and d denote coefficients for a bit rate and a video size specified by a user, and W_QP denotes a weight parameter.

19. The apparatus according to claim 7, wherein the means for instructing the computer to correct the frame rate as well as the quantization step size includes means for the computer to reset the bit rate exceeding an upper limit value or a lower limit value.

* * * * *